United States Patent [19]  [11] 3,953,048
Vincent et al.  [45] Apr. 27, 1976

[54] JOIST DOLLY

[76] Inventors: George D. Vincent, 3863 Guernsey, Memphis, Tenn. 38122; Johnie W. Morris, 6281 Branderham Drive, Memphis, Tenn. 38134

[22] Filed: Dec. 9, 1974

[21] Appl. No.: 530,528

[52] U.S. Cl. ................................ 280/47.3; 214/370; 254/8 R; 254/131
[51] Int. Cl.² ........................................... B62B 1/06
[58] Field of Search .............. 280/47.27, 47.3, 47.24; 214/370, 371, 373, 384; 254/8 R, 131, 132; 52/122, 143

[56] References Cited
UNITED STATES PATENTS

| | | | |
|---|---|---|---|
| 877,111 | 1/1908 | Newburgh | 280/47.3 X |
| 2,439,288 | 4/1948 | Evans | 280/47.3 |
| 2,981,426 | 4/1961 | Casey | 214/370 X |
| 3,257,018 | 6/1966 | Miles | 214/370 |
| 3,275,175 | 9/1966 | Arnold | 214/384 X |
| 3,395,817 | 8/1968 | Boyd et al. | 214/370 |

FOREIGN PATENTS OR APPLICATIONS

| | | | |
|---|---|---|---|
| 1,256,613 | 2/1961 | France | 254/131 |
| 584,814 | 1/1947 | United Kingdom | 280/47.24 |

*Primary Examiner*—M. H. Wood, Jr.
*Assistant Examiner*—John A. Pekar
*Attorney, Agent, or Firm*—John R. Walker, III

[57] ABSTRACT

A dolly for lifting one end of a long open web steel joist or truss and for then conveying the joist to and fro along a steel structural beam member having a horizontally disposed web which normally restingly supports the joist. The dolly includes a main body which carries an axle having a wheel journaled thereto for runningly and ridingly engaging the beam member as the joist is manually maneuvered into its optimum position. A lever or handle is fixedly attached to the main body and coacts with the wheel (which acts as a fulcrum) to lift the heavy joist as the handle is manually urged downwardly. Various embodiments of structure for engaging and supporting two different type joists are disclosed herewith.

11 Claims, 12 Drawing Figures

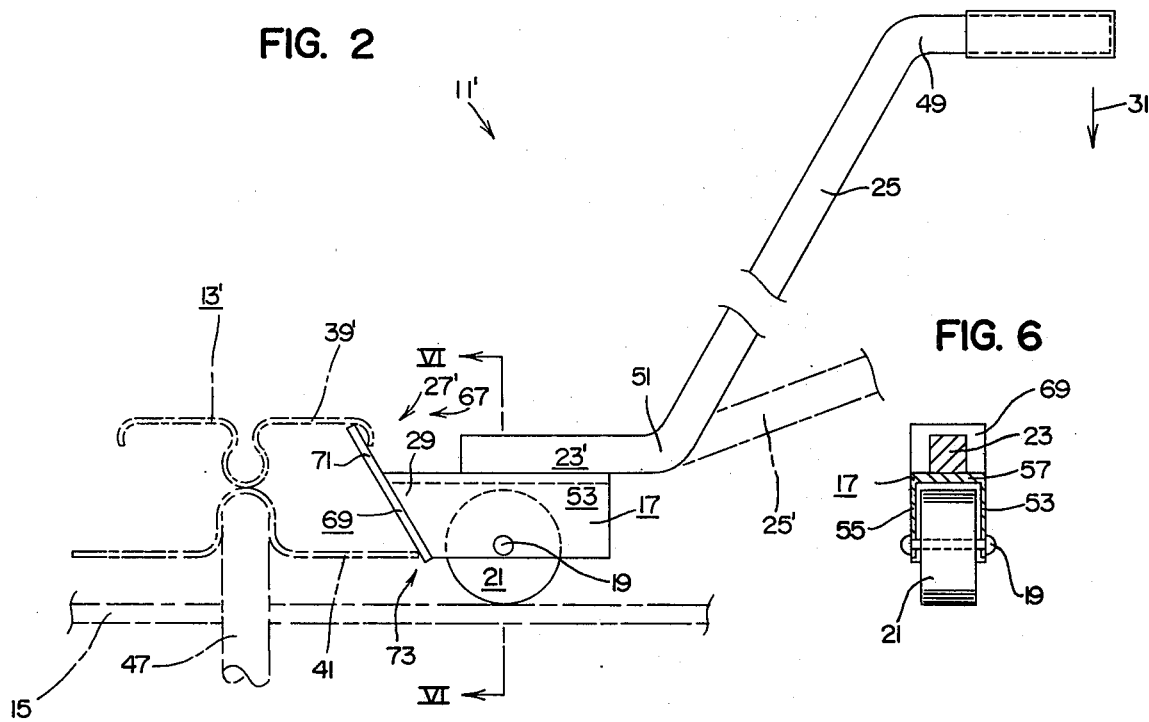

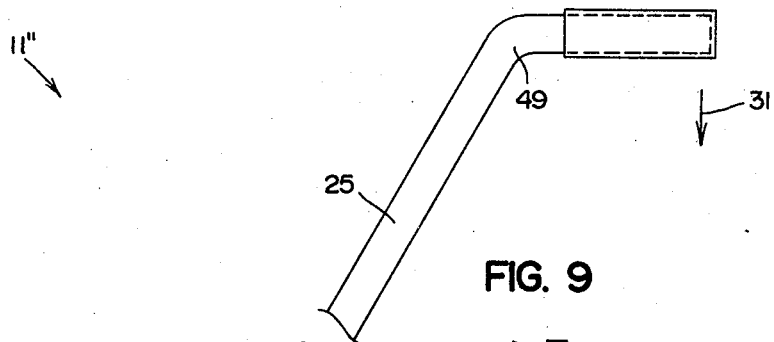
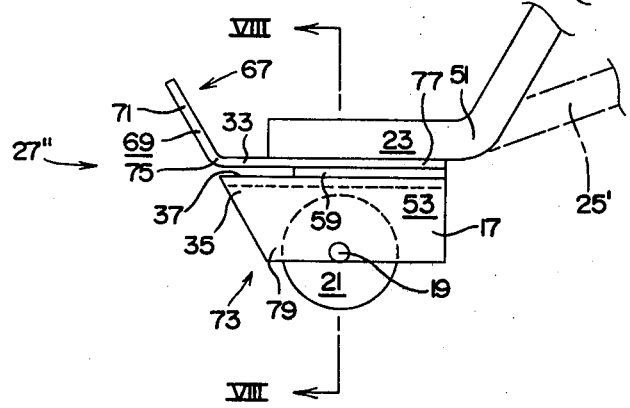
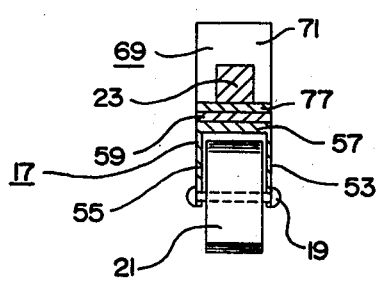
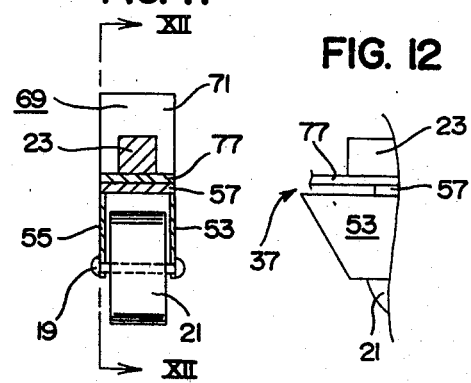
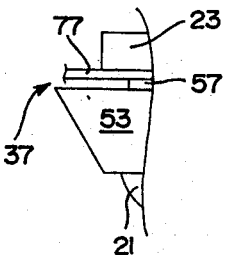

ized 2
JOIST DOLLY

BACKGROUND OF THE INVENTION

1. Field of the Invention

This invention relates to the field of dollies and is particularly directed towards a dolly for maneuvering a joist or truss with respect to a supporting structural beam member.

2. Description of the Prior Art

Dollies of limitless size, shape and description have been contemplated which usually are specifically adapted for accomplishing a given task with considerably less effort. However, applicant is unaware of any prior dolly which is either specifically directed towards conveying a joist or truss to and fro along a steel structural beam member or in any way suggests adapting prior dollies for this express purpose.

In the construction art open web steel joists or trusses are often installed to support floor structure or ceiling structure. These joists are usually very heavy and difficult to handle. In fact, a common practice for placing the steel joists is to utilize a portable crane for swinging them into place. Obviously, this practice is very costly in both equipment and manpower. A second approach to the problem, which is intended to reduce the cost considerably, is to utilize other lifting devices, e.g., a forklift or the like, to initially rest the remote ends of the joist on a pair of the steel structural beam members. This latter technique requires workmen to position themselves upon the beam member and physically lift and carry the joists to the optimum position. Obviously, this latter practice is most fatiguing and often results in injury to the workmen. More specifically, workmen occasionally lose their balance and fall from the beam member or more frequently experience back injury from lifting the heavy trusses. Moreover, since this latter technique is time-consuming the advantages thereof are often counteracted by the exorbitant cost of labor.

SUMMARY OF THE INVENTION

The present invention is directed towards overcoming the disadvantages and problems associated with placing open web steel joists or heavy trusses in optimum position upon a steel structural beam member. The concept of the present invention is to provide a leverage type dolly for lifting one end of the long open web steel joist or truss and for then conveying the joist to and fro along the supporting steel structural beam member. The steel structural beam member usually is characterized by a horizontally disposed web which normally restingly supports the joist or truss. The dolly herein disclosed includes a main body which carries a transverse axle having a wheel journaled thereupon for runningly and ridingly engaging the horizontal web as the joist is maneuvered into its optimum position and for establishing a fulcrum to facilitate lifting the joist. A handle is included to constitute a lever for cooperating with the fulcrum in lifting the joist as the handle is urged downwardly. The dolly is further characterized by one of several different embodiments of structure for engaging and supporting selectively either of two different types of joists.

DESCRIPTION OF THE DRAWINGS

FIG. 1 is a side elevational view of one embodiment of the joist dolly herein disclosed, shown suitably engaging and supporting certain structure of a first type joist with the wheel of the joist dolly shown supported upon a steel structural beam member.

FIG. 2 is a side elevational view of an alternate embodiment of the joist dolly herein disclosed shown suitably engaging certain portions of a second type joist with the wheel of the dolly shown supported by the steel structural beam member.

FIG. 3 is a sectional view taken as on the line III—III of FIG. 1.

FIG. 4 depicts an alternate arrangement of the structure depicted in FIG. 3 with the wheel and axle being deleted for brevity.

FIG. 5 is a partial side view taken as on the line V—V of FIG. 4 further depicting the alternate arrangement as shown in FIG. 4.

FIG. 6 is a sectional view taken as on the line VI—VI of FIG. 2.

FIG. 7 is a side elevational view of still another embodiment of the joist dolly herein disclosed substantially depicting a combination of the first two embodiments as shown in FIGS. 1 and 2.

FIG. 8 is a sectional view taken as on the line VIII—VIII of FIG. 7.

FIG. 9 is a view similar to FIG. 8 depicting another contemplated arrangement of certain structure.

FIG. 10 is a partial side view of the structure depicted in FIG. 9 with the view being taken as on the line X—X of FIG. 9.

FIG. 11 is also a view similar to FIG. 8 depicting still another contemplated arrangement of certain structure.

FIG. 12 is a partial side view of the structure depicted in FIG. 11 with the view being taken as on the line XII—XII of FIG. 11.

DESCRIPTION OF THE PREFERRED EMBODIMENTS

The joist dolly 11 of the present invention is intended for lifting one end of a long open web steel joist 13 and for then conveying the joist 13 to and fro along a steel structural beam member, as at 15, having a horizontally disposed web which normally restingly supports the joist in a manner well known to those skilled in the art. From FIGS. 1 and 3 of the drawings it may clearly be seen that the joist dolly 11 of the present invention includes a main body 17, transverse axle means 19 carried by the main body 17, wheel means 21 journaled upon the axle 19 for runningly and ridingly engaging the horizontal web of the structural beam member 15 and for establishing fulcrum means to facilitate lifting one end of the joist 13; handle means 23 (FIG. 1 specifically) fixedly attached to the main body 17 to constitute a lever for cooperating with the fulcrum means to further facilitate lifting one end of the joist 13 and having a portion thereof extending angularly upward and rearward from the main body 17, as at 25; and means, as at 27, disposed adjacent the forward end, as at 29, of the main body 17 for engaging and supporting the joist 13 as the handle means 23 is manually urged downwardly or in the direction of an arrow 31.

From FIG. 1 of the drawings it may also be seen that the first embodiment of the means 27 for engaging and supporting the joist 13 includes upper and lower spaced apart jaw means, as at 33, 35 respectively, defining a mouthlike opening, as at 37, for receiving a planar flange portion, as at 39, of the steel joist 13 which may hereinafter optionally be referred to as a first type joist or truss.

It should be understood that the first joist 13, in addition to the flange portion 39, includes a flange portion 41 confrontingly arranged with the flange portion 39, and a web portion 43 joining the flange portions 39, 41 one to the other establishing a channel-like member 45. Additionally a second channel-like member 45' is included which may optionally be engaged with the joist dolly 11 in the like manner as herein described for the flange 39. Further, the first joist 13 includes other structure well known to those skilled in the art, e.g., rodlike members, as at 47, which usually establish open web structure for joining a top cord (not shown) of the truss 13 and a bottom cord (not shown) thereof, which are structures well known to those skilled in the art and accordingly, in the interest of brevity are not shown in the drawings. Further, the handle means 23, or more specifically, the rearward extending portion 25 thereof may be at another angle, i.e., straighter as at 25', to enable the workmen to use the dolly 11 while in a kneeling or crawling position. In this latter event, the dogleg shape of the handle 25 or first angle portion at 49 might be deleted, i.e., the portion 25' simply extending a predetermined distance along a straight line from the angle portion 51.

The main body 17 preferably includes a pair of vertically disposed parallel spaced apart side members 53, 55 as shown in FIGS. 1 and 3 of the drawings and transversely disposed top means, as at 57, rigidly joining the side members 53, 55 one to the other.

The firstt embodiment of the means 27 for engaging and supporting the joist also includes a spacer member 59 having a predetermined thickness, i.e., preferably slightly thicker than is the flange portion 39, thus determining the spaced apart distance between the upper and lower jaws 33, 35. The spacer member 59 is fixedly attached to the top means 57 by any suitable means such as welding or the like or by bolts if desired, with the forward portion of the top means 57, i.e., that portion which is disposed just above the previously described forward portion 29, establishing the lower jaw means 35 with the forward portion 29 remaining unobstructed by the spacer member 59 thus defining in part the mouthlike opening 37.

From FIG. 1 of the drawings it may clearly be seen that the upper jaw means 33 cooperates with the spacer member 59 and the lower jaw means 35 to define the mouthlike opening 37 which is depicted freely receiving the planar flange portion 39 of the first type joist 13, i.e., the planes of the upper and lower jaw means 33, 35 are shown aligned with the planar flange portion 39. It should be pointed out that the upper and lower jaw means 33, 35 supportingly engage the planar flange portion 39 as the planes of the jaw means 33, 35 are tilted by manually urging the handle means 23 downwardly in the direction of the arrow 31. Accordingly, the joist 13 is lifted and may now manually be maneuvered to its optimum position.

Particular attention is now directed towards FIGS. 4 and 5 of the drawings wherein it may be seen that if desired, the forward extending upwardly directed portions, as at 61, of the side members indicated by the numerals 53', 55' establish the lower jaw means 35, i.e., the forward portions 61 reach under the upper planar flange portion 39 of the first type steel joist 13 as well as aid in supporting the joist 13.

An alternate embodiment of the handle means is herein disclosed and is character referenced in FIGS. 1, 4, and 5 by the numeral 23 having a prime suffix to illustrate the concept of optionally employing the handle means 23' to constitute the upper jaw means 33. This may be accomplished in any convenient manner, for example, the width of the handle means 23' might establish the spaced apart distance between the side members 53', 55' as clearly shown in FIG. 4 of the drawings. In this event, the side members 53', 55' (FIGS. 4, 5) preferably include upwardly extending portions, as at 63, which partially overlappingly engage the handle means 23' and are fixedly attached thereto in any well-known manner as by welding or the like. Additionally, the handle means 23' includes a forward extending portion, as at 65, to constitute the upper jaw means 33.

Particular attention is now directed towards FIGS. 2 and 6 of the drawings wherein it may be seen that a second embodiment of the dolly is herein disclosed and is character referenced in the drawings by the numeral 11 having a prime suffix. The dolly 11' includes a second embodiment of the means for engaging and supporting the joist and which is indicated by the numeral 27'. The means 27' includes hook means, as at 67, for engaging a second type joist indicated by the numeral 13' which includes an arcuate shaped upper flange portion 39', i.e., the hook means 67 reaches under the arcuate shaped upper flange portion 39' as clearly shown in FIG. 2 of the drawings. The hook means 67 preferably includes a transversely disposed platelike member 69 fixedly attached to the main body 17 and which terminates fixedly attached to the main body 17 and which terminates forwardly thereof at an upward and forward reaching hook portion, as at 71, for reaching under the upper arcuate flange portion 39' of the second type joist 13'. The forward ends of certain members, i.e., the side members 53, 55, of the main body 17 preferably terminate respectively along lines which substantially constitute continuations of the hook portion 71 as clearly shown in FIG. 2 of the drawings. Further, the means 27' for engaging and supporting the joist 13' includes bumper means, as at 73, for restingly engaging a lower flange portion 41' of the second type joist 13' as the handle means 23 is manually urged downwardly in the direction of the arrow 31.

It should be understood that the platelike member 69 and the forward end 29 of the main body 17 are conveniently fitted together and are fixedly attached one to the other as by welding or the like. In other words, the side members 53, 55 may straddle the lower portion of the platelike member 69 if desired, or marginal portions of the platelike member 69 may abuttingly engage the side members 53, 55 as illustrated in FIG. 2 of the drawings.

Additionally, the forward end 29 of the main body 17 or specifically the side members 53, 55 preferably are angled in a forward and upwardly extending direction, as clearly shown in FIG. 2 of the drawings. Accordingly, one embodiment of the platelike member 69 is fixedly attached, as by welding or the like, to the angled terminal ends of the side members 53, 55. The platelike member 69 extends forwardly and upwardly a predetermined distance beyond the main body 17 to constitute the previously described hook portion 71 and the lower portion of the platelike member 69 establishes the bumper means 73 alluded to above and as illustrated in FIG. 2 of the drawings.

Particular attention is now directed towards FIG. 7 of the drawings wherein it may be seen that a third embodiment of the dolly is herein disclosed and is character referenced in the drawings by the numeral 11 having a double prime suffix. The dolly 11" includes a third embodiment of the means for engaging and supporting the joist and which is indicated by the numeral 27". The means 27" includes the combination of the means 27 and the means 27'. More specifically the means 27" includes the combination of the previously described rigid jaw means 33, 35 which define the mouthlike opening 37 for receiving the upper planar flange portion 39 of the first type joist 13 and the above-described hook means 67 for reaching under the arcuate upper flange portion 39' of the second type joist 13'. In other words, the dolly 11" includes the features illustrated in FIG. 1 as well as those features illustrated in FIG. 2 and fully described above.

However, it should be pointed out that the lower end of the handle 23 of the dolly 11" preferably does not constitute the upper jaw means 33. In other words, the transverse platelike member 69 preferably is angled, as at 75, to establish both the hook portion 71 and the upper jaw means 33. Additionally, a rearward extending portion, as at 77, of the platelike member 69 is sandwiched between the lower end of the handle 23 and the spacer member 59 and are fixedly attached one to the other as by welding or other suitable means, as bolts or the like. Further, the bumper means 73 for the dolly 11" are constituted by lower portions, as at 79, of the side members 53, 55, as clearly shown in FIG. 7 of the drawings.

An alternate arrangement applicable to any of the above-described embodiments of the dolly 11 is clearly shown in FIGS. 11 and 12 of the drawings wherein it may be seen that the top means 57 constitutes the spacer means, i.e., the spacer member 59 per se being deleted. The characteristics of the top means 57, as depicted in FIGS. 11, 12, are arranged so they define in part the mouthlike opening 37.

From FIGS. 9 and 10 of the drawings it may clearly be seen that if desired, the top means 57 and the spacer member 59 may be deleted from any of the embodiments of the dolly 11 without departing from the spirit and scope of the present invention. In other words, the side members indicated by the numerals 53", 55", include upward extending portions 63' abuttingly engaged with the rearward extending portion 77 of the platelike member 69 and which are fixedly attached thereto as by welding or the like. In the latter arrangement, forward portions of the side members 53", 55" constitute the lower jaw means 35 in somewhat the same manner as previously described and as illustrated in FIGS. 4 and 5 of the drawings.

It should be pointed out that in the use of the heretofore mentioned embodiments, two dollies are preferably used in transporting a joist, that is, one dolly at each end.

Although the invention has been described and illustrated with respect to preferred embodiments thereof, it is to be understood that it is not to be so limited since changes and modifications may be made therein which are within the full intended scope of the invention.

We claim:

1. A leverage dolly for lifting one end of a long open web steel joist and for then conveying the joist to and fro along a steel structural beam member having a horizontally disposed web which normally restingly supports the joist, said dolly comprising a main body, transverse axle means carried by said main running by a single wheel journaled upon said axle means for funningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly; said means for engaging and supporting the joist including upper and lower spaced apart jaw means defining an opening for receiving a planar flange portion of a joist, said upper and lower jaw means supportingly engaging the planar flange portion of the joist as the planes of said jaw means are tilted by manually urging said handle means downwardly.

2. The dolly of claim 1 in which said main body includes a pair of vertically disposed parallel spaced apart side members, and transversely disposed top means rigidly joining said side members one to the other.

3. A leverage dolly for lifting one end of a long open web steel joist and then conveying the joist to and fro along a steel structural beam member having a horizontally disposed web which normally restingly supports the joist, said dolly comprising a main body, transverse axle means carried by said main body, a single wheel journaled upon said axle means for runningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly, said means for engaging and supporting the joist including upper and lower spaced apart jaw means defining an opening for receiving a planar flange portion of a joist, said upper and lower jaw means extending substantially equal distance along the length of one another.

4. A leverage dolly for lifting one end of a long open web steel joist and for then conveying the joist to and fro along a steel structural beam member having a horizontally disposed web which normally restingly supports the joist, said dolly comprising a main body, transverse axle means carried by said main body, wheel means journaled upon said axle means for runningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly; said main body including a pair of vertically disposed parallel spaced apart side members, and transversely disposed top means rigidly joining said side members one to the other; said means for engaging and supporting the joist including a spacer member having a predetermined thickness thereto and being fixedly attached to said top means with the forward portion of said top means establishing lower jaw means and remaining unobstructed by said spacer member, and upper jaw means for cooperating with said spacer member and said lower jaw means to define an opening for freely receiving a planar flange portion of a joist when the planes of said upper and lower jaw means are aligned with the planar flange portion, said upper and lower jaw means supportingly engaging the planar flange portion of the joist as the planes of said jaw means are tilted by manually urging said handle means downwardly.

5. The dolly of claim 4 in which forward extending upwardly directed portions of said side members establish lower jaw means to reach under and engage the upper planar flange portion of the joist and to aid in supporting the joists.

6. The dolly of claim 5 in which said top means constitutes said spacer means.

7. The dolly of claim 4 in which the lower end of said handle means constitutes said upper jaw means.

8. A leverage dolly for lifting one end of a long open web steel joist and for then conveying the joist to and fro along a steel structural beam member having a horizontally disposed web which normally restingly supports the joist, said dolly comprising a main body, transverse axle means carried by said main body, wheel means journaled upon said axle means for runningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly; said means for engaging and supporting the joist includes hook means for reaching under an arcuate shaped upper flange portion of a joist, said hook means including a transversely disposed planar member fixedly attached to said main body and terminating forwardly thereof at an upward and forward reaching hook portion for reaching under the upper arcuate flange portion of the joist, and the forward ends of said main body terminating respectively along lines which substantially constitute continuations of said hook portion, said means for engaging and supporting the joist including bumper means for restingly engaging a lower flange portion of the joist as said handle means is manually urged downwardly.

9. A leverage dolly for lifting one end of a long open web steel joist and for then conveying the joist to and fro along a steel structural beam member having a horizontally disposed web which normally restingly supports the joist, said dolly comprising a main body, transverse axle means carried by said main body, wheel means journaled upon said axle means for runningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly; said means for engaging and supporting the joist includes hook means for reaching under an arcuate shaped upper flange portion of the joist; the forward terminal ends of said main body being angled in a forward and upward extending direction, and said hook means including a planar member fixedly attached to the angled terminal ends of said main body, said planar member extending forwardly and upwardly a predetermined distance beyond said main body for reaching under an upper arcuate web portion of the joists, and the lower portion of said planar member establishing bumper means for restingly engaging a lower flange portion of the joists as said handle means is manually urged downwardly.

10. A leverage dolly for lifting one end of a long open web steel joist and for then conveying the joist to and fro along a steel structural beam member having a horizontally disposed web which normally restingly supports the joist, said dolly comprising a main body, transverse axle means carried by said main body, wheel means journaled upon said axle means for runningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly; said means disposed adjacent the forward end of said main body for engaging and supporting the joist includes hook means for reaching under an arcuate upper web portion of a joist.

11. A leverage dolly for lifting one end of a joist and for then conveying the joist to and fro along a structural beam member having a horizontally disposed web which normally restingly supports the joist, said dolly comprising a main body, transverse axle means carried by said main body, a single wheel journaled upon said axle means for runningly and ridingly engaging the horizontal web of the structural beam member and for establishing fulcrum means to facilitate lifting one end of the joist, handle means fixedly attached to said main body to constitute a lever for cooperating with said fulcrum means to further facilitate lifting one end of the joist and having a portion thereof extending angularly upward and rearward from said main body, and means disposed adjacent the forward end of said main body for engaging and supporting the joist as said handle means is manually urged downwardly; said means for engaging and supporting the joist including upper and lower spaced apart jaw means defining an opening for receiving a planar flange portion of a joist, said upper jaw means being spaced above said lower jaw means a substantially equal distance along the length thereof.

* * * * *